United States Patent [19]

Wiggins et al.

[11] 4,359,506
[45] Nov. 16, 1982

[54] TIE LAYER FOR CO-EXTRUDED ACRYLONITRILE COPOLYMERS

[75] Inventors: Wayne T. Wiggins, Aurora; Frank S. Gerry, Hudson, both of Ohio

[73] Assignee: Sohio, Cleveland, Ohio

[21] Appl. No.: 217,310

[22] Filed: Dec. 17, 1980

Related U.S. Application Data

[63] Continuation-in-part of Ser. No. 20,569, Mar. 15, 1979, abandoned.

[51] Int. Cl.³ .................. B32B 27/36; B32B 27/06; B32B 27/30; B32B 27/32
[52] U.S. Cl. ...................... 428/412; 156/244.24; 525/25; 525/310; 428/419; 428/423.3; 428/424.2; 428/424.4; 428/424.6; 428/424.7; 428/474.4; 428/474.7; 428/474.9; 428/475.5; 428/476.1; 428/515; 428/516; 428/518; 428/520; 428/521; 428/522

[58] Field of Search ............... 428/520, 521, 522, 412, 428/35, 419, 423.3, 424.2, 515, 516, 518, 522, 476.1, 424.4, 424.6, 424.7, 474.4, 474.7, 474.9, 475.5; 525/310, 25

[56] References Cited

U.S. PATENT DOCUMENTS 3,426,102  2/1969  Solak et al. ................... 525/310
4,123,576 10/1978  Kobayashi et al. ............ 428/35

*Primary Examiner*—Thomas J. Herbert, Jr.
*Attorney, Agent, or Firm*—William D. Mooney; Herbert D. Knudsen; Larry W. Evans

[57] ABSTRACT

A synthetic resin laminated structure is produced by bonding together in a molten state a layer of a (I) nitrile barrier resin, (II) a layer of a polymer mixture comprising a nitrile barrier resin and a halogenated polyolefin, and (III) a layer of a thermoplastic resin. The thermoplastic resins useful in this invention include polyolefins such as polyethylene and polypropylene, polyvinylchlorides, styrene containing polymers such as ABS, SAN and polystyrene, polycarbonates, polyurethanes, polysulfones, polyamides and nitrile barrier resins.

20 Claims, No Drawings

TIE LAYER FOR CO-EXTRUDED ACRYLONITRILE COPOLYMERS

CROSS-REFERENCE TO RELATED APPLICATIONS

This application is a continuation-in-part of U.S. Ser. No. 020,569, which was filed on Mar. 15, 1979, now abandoned.

BACKGROUND OF THE INVENTION

This invention relates to a mixture of a halogenated polyolefin and a nitrile barrier resin, and use of this mixture as a tie layer to adhere together a thermoplastic resin to a nitrile barrier resin. Optionally, these tie layers contain other thermoplastic resins.

Composite structures composed of at least one layer of a thermoplastic resin and at least one layer of a nitrile barrier resin have been prepared and are found to be useful for many purposes, primarily for packaging. Packages of such composites have excellent gas barrier properties, they are particularly good barriers to oxygen, carbon dioxide and water vapor, and they can be fabricated by heat sealing. Manufacture of such composites is not easy because of the lack of adhesion between the surfaces of most thermoplastic resins and a nitrile barrier resin. This lack of adhesion has been improved in the past by the discovery of new adhesives such as those disclosed in U.S. Pat. No. 4,123,576.

SUMMARY OF THE INVENTION

We have discovered that laminated structures having outer surfaces comprising a thermoplastic resin and a nitrile barrier resin can be made by employing as a tie layer for adhering these polymers together a mixture of (1) a halogenated polyolefin and (2) a nitrile barrier resin. The proportion of these materials in the tie layer and the temperature at which the mixture is bonded to the outer layers of the laminate affect the strength of the adhesion. One decided advantage in the present invention is that scrap material can be reground and used in the tie layer with some adjustment of the essential components.

DETAILED DESCRIPTION

The halogenated polyolefins used in the above described tie layers include halogenated polyethylene, halogenated polypropylene, halogenated polybutylene and halogenated olefin copolymers. Preferred are chlorinated and brominated polyolefins and most preferred are chlorinated polyethylenes and chlorinated polypropylenes.

The high nitrile copolymers useful in this invention are those produced by polymerizing a major proportion of a monounsaturated nitrile, e.g. acrylonitrile, and a minor proportion of another monovinyl monomer component copolymerizable therewith, optionally in the presence of a diene rubber which may be a homopolymer or copolymer of a conjugated diene monomer.

These high nitrile polymeric compositions can be prepared by any of the generally known techniques of polymerization including bulk polymerization, solution polymerization and emulsion or suspension polymerization by batch, continuous or intermittent addition of the monomers and other components. The preferred method is by emulsion or suspension polymerization in an aqueous medium in the presence of a free-radical generating polymerization initiator at a temperature of from about 0° C. to 100° C. in the substantial absence of molecular oxygen.

The monounsaturated nitriles are the alpha, beta-olefinically unsaturated nitriles having the structure:

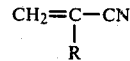

wherein R is hydrogen, a lower alkyl group having from 1 to 4 carbon atoms or a halogen. Such compounds include acrylonitrile, alpha-chloroacrylonitrile, alpha-fluoroacrylonitrile, methacrylonitrile, ethacrylonitrile and the like. The most preferred monounsaturated nitriles are acrylonitrile and methacrylonitrile and mixtures thereof.

The monomer component copolymerizable with the monounsaturated nitrile includes one or more of the esters of olefinically unsaturated carboxylic acids, vinyl esters, vinyl ethers, vinyl ketones, alpha-olefins, vinyl aromatic monomers and others.

The esters of olefinically unsaturated carboxylic acids include those having the structure:

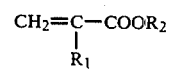

wherein $R_1$ is hydrogen, an alkyl group having from 1 to 30 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, the hexyl acrylates, methyl methacrylate, ethyl methacrylate, the propyl methacrylates, the butyl methacrylates, the amyl methacrylates and the hexyl methacrylates, methyl alpha-chloroacrylates, ethyl alpha-chloroacrylates and the like. Most preferred in the present invention are methyl acrylate, ethyl acrylate, methyl methacrylate and ethyl methacrylate.

The alpha-olefins are those having at least 4 and as many as 10 carbon atoms having the structure:

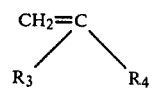

wherein $R_3$ and $R_4$ are alkyl groups having from 1 to 7 carbon atoms, and more specifically isobutylene, 2-methyl butene-1, 2-methyl pentene-1, 2-methyl hexene-1, 2-methyl heptene-1, 2-methyl octent-1, 2-ethyl butene-1, 2-propyl pentene-1, and the like. Most preferred is isobutylene.

The vinyl ethers include methyl vinyl ether, ethyl vinyl ether, propyl vinyl ethers, the butyl vinyl ethers, methyl isopropenyl ether, ethyl isopropenyl ether and the like. Most preferred are methyl vinyl ether, ethyl vinyl ether, the propyl vinyl ethers, and the butyl vinyl ethers.

The vinyl esters include vinyl acetate, vinyl propionate, the vinyl butyrates and the like. Most preferred is vinyl acetate.

The vinyl aromatic monomers include styrene, alpha-methyl styrene, the vinyl toluenes, the vinyl xylenes and the like. Most preferred is styrene.

The olefinic nitrile copolymer is optionally in the presence of a preformed diene rubber which may be a homopolymer or copolymer of a conjugated diene monomer. These monomers include butadiene-1,3, isoprene, chloro-prene, bromoprene, cyanoprene, 2,3-dimethyl butadiene-1,3, 2-ethyl butadiene-1,3 2,3-diethyl butadiene-1,3 and the like. Most preferred for the purpose of this invention are butadiene-1,3 and isoprene because of their ready availability and their excellent polymerization properties.

The conjugated diene monomer may be copolymerized with a comonomer selected from the group consisting of vinyl aromatic monomer, an olefinic nitrile monomer having the structure:

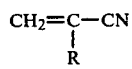

$$CH_2=C-CN$$
$$\quad\ |$$
$$\quad\ R$$

wherein R has the foregoing designation, and an ester having the structure:

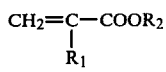

$$CH_2=C-COOR_2$$
$$\quad\ \ \ \ |$$
$$\quad\ \ \ \ R_1$$

wherein $R_1$ and $R_2$ have the foregoing designations. The rubbery polymer contains from 50% to 100% by weight of polymerized conjugated diene monomer and from 0% to 50% by weight of the comonomer.

Preferred polymers useful in this invention are those prepared by the polymerization of 100 parts by weight of (A) from 60% to 90% by weight of at least one nitrile having the structure:

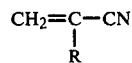

$$CH_2=C-CN$$
$$\quad\ |$$
$$\quad\ R$$

wherein R has the foregoing designation, and (B) from 10% to 40% by weight based on the combined weights of (A) and (B) of at least one member selected from the group consisting of (1) an ester having the structure:

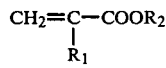

$$CH_2=C-COOR_2$$
$$\quad\ \ \ \ |$$
$$\quad\ \ \ \ R_1$$

wherein $R_1$ and $R_2$ have the foregoing respective designations, (2) an alpha-olefin having the structure:

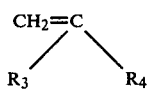

$$CH_2=C\diagup^{R_3}\diagdown_{R_4}$$

wherein $R_3$ and $R_4$ have the foregoing respective designations, (3) a vinyl ether selected from the group consisting of methyl vinyl ether, ethyl vinyl ether the propyl vinyl ethers, and the butyl vinyl ethers, (4) vinyl acetate, (5) styrene, and (6) indene, in the presence of from 0 to 40 parts by weight of (C) a rubbery polymer of a conjugated diene monomer selected from the group consisting of butadiene and isoprene and optionally a comonomer selected from the group consisting of styrene, a nitrile monomer having the structure:

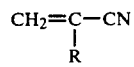

$$CH_2=C-CN$$
$$\quad\ |$$
$$\quad\ R$$

wherein R has the foregoing designation, and an ester having the structure:

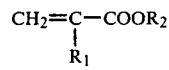

$$CH_2=C-COOR_2$$
$$\quad\ \ \ \ |$$
$$\quad\ \ \ \ R_1$$

wherein $R_1$ and $R_2$ have the foregoing respective designations, said rubbery polymer containing from 50% to 100% by weight of polymerized conjugated diene and from 0% to 50% by weight of a comonomer.

The most preferred nitrile copolymers are prepared by the polymerization of between 70 and 80 parts by weight of (A) and 20 to 30 parts by weight of (B) in the presence of from 5 to 15 parts by weight of (C).

The tie layer can additionally contain other thermoplastic resins. Examples of thermoplastic resins which have been found to be effective in the tie layer for improving adhesion include polyolefins such as polyethylene and polypropylene, styrenics such as styreneacrylonitrile copolymers, acrylonitrile-butadiene-styrene terpolymers and polystyrene, nylons such as nylon-11, nylon-6, nylon-6,6 and nylon-12, polyvinylchlorides and polyurethanes. This additional tie layer component may be the same as or different from the thermoplastic resin which comprises the outer layer of the laminate. Preferred tie layers comprise a three component system containing a halogenated polyolefin, a nitrile barrier resin and the thermoplastic resin which comprises the outer layer of the laminate. For example, to bond a nitrile barrier resin to polypropylene, it is preferred to use a tie layer comprising a halogenated polyolefin, nitrile barrier resin and polypropylene. It has also been discovered that the addition of polyurethane as a fourth component to the tie layer improves adhesion.

The ratio of the various components in the tie layer vary depending upon their identity and the identity of the outer layers in the laminate. Generally, it is preferred to have at least 40% of the tie layer comprise the halogenated polyolefin and at least 10% comprise the nitrile barrier resin.

The tie layer components can be mixed by any of the generally known methods such as a melt mixing method in which a roll kneader, a Banbury kneader, a screw extruder or the like is used.

These tie layers are used to bond together in a molten state the outer layers of the laminate. One outer layer comprises the nitrile barrier resin discussed above. The second outer layer comprises a thermoplastic resin. Examples of thermoplastic resins which are suitable for the second outer layer include styrenics such as styreneacrylonitrile copolymers, acrylonitrile-butadiene-styrene terpolymers and polystyrene, polyolefins such as polyethylene and polypropylene, polyvinylchlorides, polyurethanes, polycarbonates, polyamides such as nylon-11, nylon-12, nylon-6 and nylon-6,6 and polysulfones. Preferably, this outer layer comprises either a polyolefin or a polyamide. It is especially preferred to use the instant invention to bond together a nitrile barrier resin and a thermoplastic resin which would not bond together in the absence of a tie layer.

By the method of this invention, adhesion of the nitrile barrier resin and a thermoplastic resin is easily achieved. The resultant laminated structures may be in the form of a sheet, film, tube or a hollow article such as a bottle. It is also possible to use any number of layers provided that a tie layer is interposed between each of the polymer outer layers. Thus, a laminated structure comprising a nitrile barrier resin—tie layer—thermoplastic resin—tie layer—nitrile barrier resin can be produced. This sequence of layers can be continued to create the desired structure.

This invention is particularly applicable to the coextrusion process. Two thermoplastic polymer materials, e.g. a polyolefin and a nitrile barrier resin, are adhered together in the molten phase while being shaped by passage through a die. The tie layer is also in the molten state in the coextrusion process and is also shaped by means of passing it through a die. In the coextrusion process, the components of the tie layer are weighed, powder blended and fed into an extruder hopper and continuously passed from the hopper to the extruder where they are mixed, heated to a melt, and extruded between two outside layers of extruded polyolefin and nitrile barrier resin. The tie layer components may also be introduced in the coextrusion process in predensified from. The three shaped melt streams of polymer are combined using a coextrusion adapter and die in a one-step in-line manufacturing operation. This permits the component layers to flow together to form the desired multilayer structure.

The tie layer can be extruded within a temperature range of 300° F. to 450° F. The exact temperature will depend on the identity of the thermoplastic resins being melted. Preferably, the tie layer melt should be extruded between 390° F. and 410° F. for best results.

In making the composite coextruded structures of this invention, the pressure in the die may reach as high as 8,000 psi. The normal pressure is about 2,500 psi.

The halogenated polyolefins useful in this invention may contain cross-linking agents such as a peroxide.

The invention is further illustrated in the following examples wherein the amounts of ingredients are expressed in parts by weight unless otherwise indicated. In the examples, the composite sheets were prepared using a coextrusion adapter which was of conventional feed block design. Three extruders fed this multiple inlet heated block. The three still separate melt streams were aligned in the direction of the outlet and fed into a converging plate which directed the flow into the single manifold and die. At the point of entry into the die, the melts flowed into contact and distributed to the contour of the die.

EXAMPLES 1-3

A mixture of (1) a high nitrile barrier resin prepared by copolymerization of 75 parts by weight of acrylonitrile and 25 parts by weight of methyl acrylate in the presence of 10 parts by weight of a rubbery copolymer of butadiene and acrylonitrile in accordance with U.S. Pat. No. 3,426,102 (which is herein incorporated by reference), (2) a low density polyethylene having a melt index of 0.25 and density of 0.919, and (3) a chlorinated low density polyethylene having 36% to 42% chlorine by weight in which the weight ratio varied as shown below in Table I was prepared by powder blending the three components. The mixture was placed in a Brabender extrusion apparatus and was melt extruded into a coextrusion adapter at 390° F. At the same time, some resin (1) and some resin (2) were also independently and simultaneously extruded in a coextrusion adapter. The three coextruded materials were passed through a 6-inch sheet die at 400° F. where the melts were allowed to flow freely in a laminar form and the mixture of resins served as a tie layer between outer layers of resins (1) and (2). The resulting laminated sheet was found to be very uniform with about 27-mil thickness. The peel strength as measured by an Instron ASTM #1876 (1971 Part 6) apparatus using a 180° peel on a 1-inch wide sample approximately 6 inches long. The peel strength as determined at a 2-inch-per-minute rate from edge to edge of the laminate is shown in Table I.

EXAMPLES 4—7

The procedure of Example 1 was repeated except that the tie layer mixture did not contain any of (2). The weight ratio of the tie layer components and the 180° peel strength of the resultant laminate are shown in Table I.

EXAMPLES 8-24

The procedure of Example 1 was repeated except that the thermoplastic resins in the tie layer and in the outer layer were varied. The identity of the components in the tie layer and outer layers, the weight ratio of the components in the tie layer and the 180° peel strength of the resultant laminate are shown in Table I.

COMPARATIVE EXAMPLE A

A repeat of Example 1 using only resins (1) and (2) with no tie layer produced a product outside the scope of this invention which showed no measurable peel strength between the coextruded layers.

COMPARATIVE EXAMPLE B

A repeat of Example 1 except that only resin (3) (chlorinated polyethylene) was used as the tie layer produced a coextruded composite outside the scope of the present invention having a peel strength of only 1.50 pounds per linear inch. Thermal stability was a severe problem during processing of this composite. Each of the examples of the instant invention produced a composite which was thermally stable during processing.

COMPARATIVE EXAMPLE C

A repeat of Example 1, except that resin (3) was excluded from the tie layer, produced a composite sheet which was outside the scope of this invention having a peel strength of only about 0.5 pounds per linear inch.

COMPARATIVE EXAMPLE D

A repeat of Example 1 except that no tie layer was used and (2) was an acrylonitrile-butadiene-styrene copolymer was performed. Since both outer layers of the laminate contained a nitrile polymer, the adhesion was good even in the absence of a tie layer. However, the adhesion of this laminate was greatly improved by the addition of a tie layer (see Example 16).

TABLE 1

180° Peel Strengths of Various Laminates

| Example | Tie Layer Composition | Tie Layer Ratio | Outer Layer (1) | Outer Layer (2) | 180° Peel Strength (Lb/Linear Inch) |
|---|---|---|---|---|---|
| 1 | CPE/Nitrile Resin/LDPE | 4/1/1 | Nitrile Resin | LDPE | 2.5 |
| 2 | " | 3/2/1 | " | " | 3.1 |
| 3 | " | 8/1/1 | " | " | 2.0 |
| 4 | CPE/Nitrile Resin | 1/1 | " | " | 0.2 |
| 5 | " | 2/1 | " | " | 2.0 |
| 6 | " | 3/1 | " | " | 1.7 |
| 7 | " | 4/1 | " | " | 1.3 |
| 8 | CPE/Nitrile Resin/LDPE/Polyurethane | 4/1/1/1 | " | " | 2.8 |
| 9 | CPE/Nitrile Resin/LDPE/Polyurethane | 4/2/1/1 | " | " | 2.4 |
| 10 | CPE/Nitrile Resin/HDPE | 3/1/1 | " | HDPE | 1.7 |
| 11 | CPE/Nitrile Resin/HDPE/Polyurethane | 4/1/1/1 | " | " | 3.4 |
| 12 | CPE/Nitrile Resin/LDPE | 2/1/1 | " | " | 2.9 |
| 13 | CPE/Nitrile Resin/HDPE | 3/1/1 | " | MDPE | 4.2 |
| 14 | CPE/Nitrile Resin/MDPE/Polyurethane | 4/1/1/1 | " | MDPE | 4.3 |
| 15 | CPE/Nitrile Resin/PP/Polyurethane | 4/1/1/1 | " | PP | 2.0 |
| 16 | CPE/Nitrile Resin/ABS | 3/1/1 | " | ABS | 5.2 |
| 17 | CPE/Nitrile Resin/SAN | 3/1/1 | " | SAN | 10.0 |
| 18 | CPE/Nitrile Resin/LDPE | 2/1/1 | " | Polystyrene | 0.6 |
| 19 | CPE/Nitrile Resin/LDPE/Polyurethane | 4/1/1/1 | " | " | 4.05 |
| 20 | CPE/Nitrile Resin/Polystyrene | 4/1/1 | " | " | 2.04 |
| 21 | CPE/Nitrile Resin | 2/1 | " | Nylon-11 | 0.4 |
| 22 | CPE/Nitrile Resin/Nylon-11 | 3/1/3 | " | " | 0.1 |
| 23 | CPE/Nitrile Resin/Nylon-11 | 3/1/1 | " | " | 2.2 |
| 24 | CPE/Nitrile Resin/ | 2/1/1 | " | PVC | 1.2 |

TABLE II

Comparative Examples

| Example | Tie Layer Composition | Tie Layer Ratio | Outer Layer (1) | Outer Layer (2) | 180° Peel Strength (Lb/Linear Inch) |
|---|---|---|---|---|---|
| A | None | — | Nitrile Resin | LDPE | 0.0 |
| B | CPE | — | " | " | 1.5 |
| C | Nitrile Resin/LDPE | 1/1 | " | " | 0.5 |
| D | None | — | " | ABS | 3.1 |

Although only a few embodiments of this invention have been specifically described above, it should be appreciated that many additions and modifications can be made without departing from the spirit and scope of the invention. These and all other modifications are intended to be included within the scope of this invention, which is to be limited only by the following claims.

We claim:

1. A laminated structure comprising
   (I) a first outer layer composed of a nitrile barrier resin,
   (II) a tie layer comprising a mixture of
      (1) a nitrile barrier resin, and
      (2) a halogenated polyolefin, and
      (3) a thermoplastic resin other than (1) and (2), and
   (III) a second outer layer composed of a thermoplastic resin.
2. The structure of claim 1 wherein the halogenated polyolefin is at least one member selected from the group consisting of halogenated polyethylene, halogenated polypropylene, and halogenated polybutylene.
3. The structure of claim 1 wherein the tie layer comprises not more than 25% of the nitrile barrier resin.
4. The structure of claim 1 wherein the tie layer comprises not more than 20% of the nitrile barrier resin.
5. The structure of claim 1 wherein the nitrile barrier resin comprises
   (A) from 60% to 90% by weight of at least one nitrile having the structure:

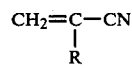

wherein R is hydrogen, a lower alkyl group having from 1 to 4 carbon atoms, or a halogen,
   (B) from 10% to 40% by weight based on the combined weight of (A) and (B) of at least one member selected from the group consisting of
      (1) an ester having the structure:

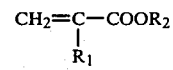

wherein $R_1$ is hydrogen, an alkyl group having from 1 to 4 carbon atoms, or a halogen, and $R_2$ is an alkyl group having from 1 to 6 carbon atoms, (2) an alpha-olefin having the structure:

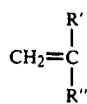

wherein R' and R'' are alkyl groups having from 1 to 7 carbon atoms, (3) a vinyl ether selected from the group consisting of methyl vinyl ether, ethyl vinyl ether, the propyl vinyl ethers, and the butyl vinyl ethers, (4) vinyl acetate, (5) styrene, and (6) indene, and from 0 to 40 parts by weight of (C) a rubbery polymer of a conjugated diene monomer selected from the group consisting of butadiene and isoprene and a comonomer selected from the group consisting of styrene, a nitrile monomer having the structure:

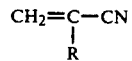

wherein R has the foregoing designation, and an ester having the structure:

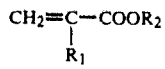

wherein $R_1$ and $R_2$ have the foregoing designations, said rubbery polymer containing from 50% to 100% by weight of polymerized conjugated diene and from 0% to 50% by weight of comonomer.

6. The structure of claim 5 wherein (A) is acrylonitrile, (B) is methyl acrylate, and (C) is a butadiene-acrylonitrile rubbery polymer.

7. The structure of claim 1 wherein at least 40% of the tie layer comprises the halogenated polyolefin.

8. The structure of claim 7 wherein at least 60% of the tie layer comprises the halogenated polyolefin.

9. The structure of claim 1 wherein at least 10% of the tie layer comprises the nitrile barrier resin.

10. The structure of claim 9 wherein at least 25% of the tie layer comprises the nitrile barrier resin.

11. The structure of claim 1 wherein the third component is selected from the group consisting of styrenics, polyolefins, polyurethanes, polyvinyl chlorides, polysulfones, polycarbonates and polyamides.

12. The structure of claim 11 wherein the third component of the tie layer is the same as the thermoplastic resin which comprises the second outer layer.

13. The structure of claim 12 wherein the tie layer contains a fourth component comprising a polyurethane.

14. The structure of claim 1 wherein the second outer layer is selected from the group consisting of styrenics, polyolefins, polyurethanes, polyvinylchlorides, polysulfones, polycarbonates and polyamides.

15. The structure of claim 14 wherein the second outer layer is a polyolefin.

16. The structure of claim 15 wherein the polyolefin is selected from the group consisting of polyethylene and polypropylene.

17. The structure of claim 14 wherein the second outer layer is a polyamide.

18. The structure of claim 17 wherein the polyamide is selected from the group consisting of nylon-11, nylon-6, nylon-6,6 and nylon-12.

19. The structure of claim 14 wherein the second outer layer is a styrenic.

20. The structure of claim 19 wherein the styrenic is selected from the group consisting of polystyrene, acrylonitrile-styrene copolymers and acrylonitrile-butadiene-styrene terpolymers.

* * * * *